US008517386B1

(12) United States Patent
Kilpatrick (10) Patent No.: US 8,517,386 B1
(45) Date of Patent: Aug. 27, 2013

(54) SYSTEM AND METHOD FOR MARKING POINTS FOR PLACING OBJECTS AT A GEOGRAPHICAL AREA FROM A REMOTE LOCATION

(76) Inventor: Harold D. Kilpatrick, McDonough, GA (US)

( * ) Notice: Subject to any disclaimer, the term of this patent is extended or adjusted under 35 U.S.C. 154(b) by 1818 days.

(21) Appl. No.: 11/625,933

(22) Filed: Jan. 23, 2007

Related U.S. Application Data

(60) Provisional application No. 60/810,795, filed on Jun. 2, 2006.

(51) Int. Cl.
*A63F 13/00* (2006.01)
(52) U.S. Cl.
USPC .......................................................... 273/317
(58) Field of Classification Search
USPC .................... 273/317; 342/357.03; 473/407; 239/69
See application file for complete search history.

(56) References Cited

U.S. PATENT DOCUMENTS

| | | | | |
|---|---|---|---|---|
| 5,044,634 A * | 9/1991 | Dudley | | 473/169 |
| 5,685,786 A * | 11/1997 | Dudley | | 473/407 |
| 6,024,655 A * | 2/2000 | Coffee | | 473/407 |
| 7,014,576 B1 * | 3/2006 | Posey | | 473/407 |
| 2002/0142866 A1 * | 10/2002 | Wallerstein | | 473/407 |
| 2003/0103001 A1 * | 6/2003 | Huston et al. | | 342/357.03 |
| 2004/0147329 A1 * | 7/2004 | Meadows et al. | | 473/131 |
| 2006/0202051 A1 * | 9/2006 | Parsons et al. | | 239/69 |

* cited by examiner

*Primary Examiner* — Paul A D'Agostino
*Assistant Examiner* — Ankit Doshi
(74) *Attorney, Agent, or Firm* — Daniel S. Polley, P.A.

(57) ABSTRACT

A system and method for digitally marking sprinkler head or other item locations for a geographical location, such as a golf course hole, where the digital marking is performed from a location remote to the area of the golf course. An individual at the golf course provides a digital representation of the golf course hole including any bunkers, greens, teas and transmits such information back to a remote location where a second individual marks sprinkler head locations on an overhead layout of the golf course hole, along with type of sprinkler head information. The mark information is then transmitted back to the individual at the golf course hole who uses such information to physically mark the golf course hole such as with flags or stakes to represent the various sprinkler hole locations.

22 Claims, 5 Drawing Sheets

| Symbol | Description |
|---|---|
| Pink ▨ | ◉ TORO 750-06-548 70' RADIUS |
| Orange ▨ | ◉ TORO 785-5-6-84-8 70' RADIUS |
| Pink ▨ | ● TORO 750-06-578 80' RADIUS |
| Orange ▨ | ◐ TORO 785-5-6-89-8 80' RADIUS |
| Pink ▨ | ◉ TORO 750-06-598 90' RADIUS |
| Orange ▨ | ◉ TORO 785-5-6-89-9 88' RADIUS 692-06-909 90' RADIUS (DRIVING RANGE ONLY) |
| Blue ☰ | ▲ TORO S-600 PC-1.3 35' RADIUS @ 25 PSI |
| Blue ☰ | ▲ TORO S-600-PC-5.0 50' RADIUS @ 50PSI |
| Red ‖ | ● TORO 570 V-15 12' RADIUS @ 30 PSI |
| Black ■ | ▢ MAINLINE LOCATION |
| White ▢ | ▢ SATELLITE LOCATION |

FIG. 5

SYSTEM AND METHOD FOR MARKING POINTS FOR PLACING OBJECTS AT A GEOGRAPHICAL AREA FROM A REMOTE LOCATION

FIELD OF THE INVENTION

The invention relates generally to marking various points for a geographical area, such as but not limited to a golf course hole, and particularly to a system and method for marking locations for sprinklers for a golf course from a location remote to the golf course.

BACKGROUND OF THE INVENTION

Currently when an irrigation designer(s)/consultant(s)/specialist(s) or other marking individual(s) or marking personnel (all collectively referred to as "designer") is employed to mark sprinkler locations for a golf course, the irrigation designer must be present at the golf course. The irrigation designer individual, while standing at a golf course hole, identifies various locations for the installation of the sprinklers and layout patterns using measuring tape or pre-measured wire, ropes or chains. The sprinkler location information can be entered into or collected by the designer or a second person using a GIS (Global Imaging System)/GPS (Global Positioning System) type of device for subsequent printing or display by the irrigation designer or another individual. Flags/stakes marking the sprinkler locations for the golf course hole can be installed at the time of their location determinations, or the saved information can be later used to place flags or stakes on the golf course hole. The installer (contractor) of the sprinkler system uses the flags or stakes to identify the location of the sprinklers for the golf course sprinkler system when physically installing the sprinklers and related system components at these locations.

As mentioned above, in the current practice the irrigation designer identifying the various sprinkler locations, as well as each sprinkler head ranges and spray patterns, must be present at the golf course in order to perform the service. Thus, the irrigation designer is restricted as to the number of golf course holes he or she can work on at one time, and is also restricted on the number of golf course locations that can be worked on. Thus, the irrigation designer is limited in the amount of golf course projects he or she can accept for a given time period. Also the process while on site requires the use of costly additional personnel from the golf course and/or irrigation contractor staff to assist in holding tapes during the various staking procedures. Depending on the staking or layout required, this can take as many as three to four additional personnel.

In addition, the staking effort is difficult due to the inability to see the golf hole in its entirety or enjoy a "bird's eye view" as is made possible during the original design preparation making accurate layout suffer and can result in the expensive addition of sprinklers to compensate for these inefficiencies.

The present invention is directed to overcoming this problem.

SUMMARY OF THE INVENTION

The present invention generally provides a system and method for digitally marking and staking sprinkler locations for a golf course hole with the digital marking being performed from a location remote from the golf course and not requiring the irrigation designer performing the marking to be present at the golf course.

Initially, a first individual (who may or may not be the irrigation designer) having a GIS/GPS unit in hand travels with the GIS/GPS unit around the golf course hole to collect data for creating a rough overhead visual representation of the layout for the golf course hole. The various bunkers, greens, tee area, water traps and/or other necessary identifying objects, can be roughly outlined with the GIS marking device and revealed in the overhead visual representation. Once the visual representation is completed by the first individual at the golf course, the visual representation is transmitted, preferably wirelessly, to a remote location where a second individual is present. Using the received visual representation, the second individual determines the locations for the sprinklers for the golf course and can also determine the range and/or spray pattern or radius for each sprinkler. The second individual at the remote location digitally marks on the overhead visual layout the various sprinkler locations. Additionally, to represent different sprinkler spray ranges and/or patterns, different color codes or numbers or other distinguishing indicia can also be provided for each sprinkler location to not only indicate the location for the sprinkler, but the type of sprinkler to be installed at such location.

Once the second individual is satisfied with the sprinkler locations or has otherwise completed marking of the golf course hole, such information is transmitted back to the first individual at the golf course hole who can receive the information preferably with the same GIS/GPS device. Using the fully digitally marked or staked layout received from the second individual, the first individual then uses the information to place physical flags or stakes at the golf course hole locations indicated on the received visual representation, which can also be in conjunction with GIS/GPS coordinate information.

Thus, with the present invention, the second individual who is responsible for determining the sprinkler locations, is not required to be at the golf course hole, and thus can work on multiple projects from different geographical locations within the same day. Additionally, as the layout for the golf course hole is an overhead representation, the second individual is provided with more information when making the sprinkler location determinations, which can result in a more efficient watering system for the golf course hole. The invention also minimizes personnel requirements as the staking can be performed by only one person on site. This saves clients in travel time, manpower and the considerable expenses associated with both.

DETAILED DESCRIPTION OF THE PREFERRED EMBODIMENT

A system and method is provided for digitally marking and staking sprinkler locations for a golf course hole with the digital marking being performed from a location remote from the golf course and not requiring the individual performing the marking to be present at the golf course. Though the invention will be described in conjunction with identifying or marking sprinkler locations for a golf course hole, the present invention is not considered limited to or useful only for marking sprinkler locations for a golf course hole. Accordingly, the present invention method and system can also be used for marking other items for a geographical area from a remote location and all such other uses are also considered within the scope of the invention.

A GIS technician or other individual (collectively referred to as "technician") preferably travels to the project site, such as a golf course, and collects all feature data for each golf hole to be staked for irrigation installation which can include, but not limited to, at least some of the following: greens, fairways, tee area, bunkers, water hazards, lakes, trees, etc. Existing vegetation data can also be collected as feasible or as is necessary.

Figure 4:
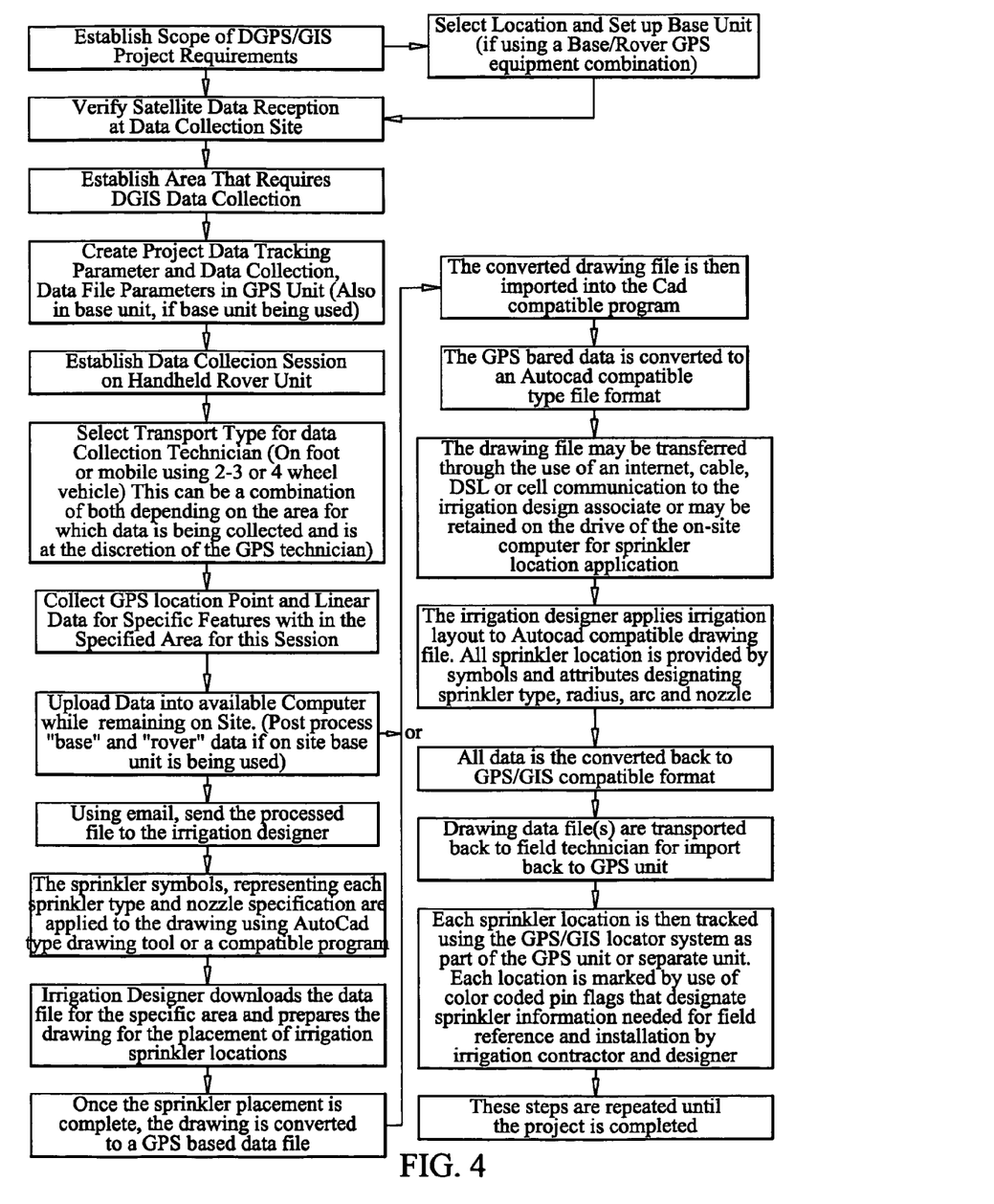
FIG. 4 is a flowchart of the various steps in accordance with one embodiment of the present invention system and method.

As seen in FIG. 4, initially the scope of the project requirements can be established and all necessary GIS equipment set up and confirmed for proper operation. If the technician is using a base/rover GPS equipment combination, then the location can be selected and the base unit can be set up. Satellite data reception can be preferably performed at the data collection site. Any area that requires DGIS data collection can also be established. The project data tracking parameter and data collection data file parameters in GPS unit (also in the base unit, if base unit being used) can be created and a data collection session on a handheld rover unit or other collection device can be established.

The technician selects his or her transport type for collecting the date, which can include, but is not limited to, on foot or mobile using 2-3 or 4 wheel vehicles, golf carts, scooters, bicycle, etc. Additionally, a combination of transport types can also be used, especially depending on the area for which data is being collected. The choice of collection transportation can be at the discretion of the GPS technician.

Thus, the present invention is not limited to any particular GPS/GIS equipment or limited to any particular type of transportation means. Any equipment and/or transportation device which will allow the technician to create an accurate overhead representation of the golf course hole (or other area) that can be transmitted to a remote location for use in adding sprinkler locations (or other objects) on the representation can be used and all are considered within the scope of the invention.

While moving along or around the golf course hole, the technician collects GPS location points and linear data for specific features (discussed above) for the golf course hole, preferably within the specified area for the session. The collected data can then be uploaded into available computer or similar device (PDA, laptop, Blackberry, cellphone, etc.) by the technician at the golf course (i.e. who preferably remains on site). Where an on site base unit is being used, the technician can post process the collected "base" and "rover" data. Thus, the point and linier data can be collected and then processed by the field technician on site and uploaded to a portable computer or like device.

The uploaded data file can then be sent to a location remote to the golf course, such as by an email link or other digital transmission technology. In one non-limiting embodiment, the remote location can be a business office of or other location occupied by the individual (irrigation specialist/designer/consultant) who assigns the sprinkler locations for the golf course hole. Thus, the irrigation designer can be located literally anywhere in the country, if not world, and still receive the transmitted processed file of the golf course hole overhead representation for identifying sprinkler locations.

The received base GIS/GPS (Global Imaging System/Global Positioning System) collected data received at the remote location can be imported into a drafting program, such as, but not limited to an AutoCAD computer drafting program, Eagle Point or Eaglepoint software program, programs for placing symbols onto a drawing or like program(s). The GIS/GPS data can then be converted into map layer through conversion procedures to yield a digital overhead representation of the golf course hole and related features (e.g. bunkers, greens, fairways, vegetation, etc.) (See FIG. 1). Thus, the irrigation designer preferably downloads the data file for the specific area and prepares the drawing for the placement of irrigation sprinkler locations.

Figure 1:
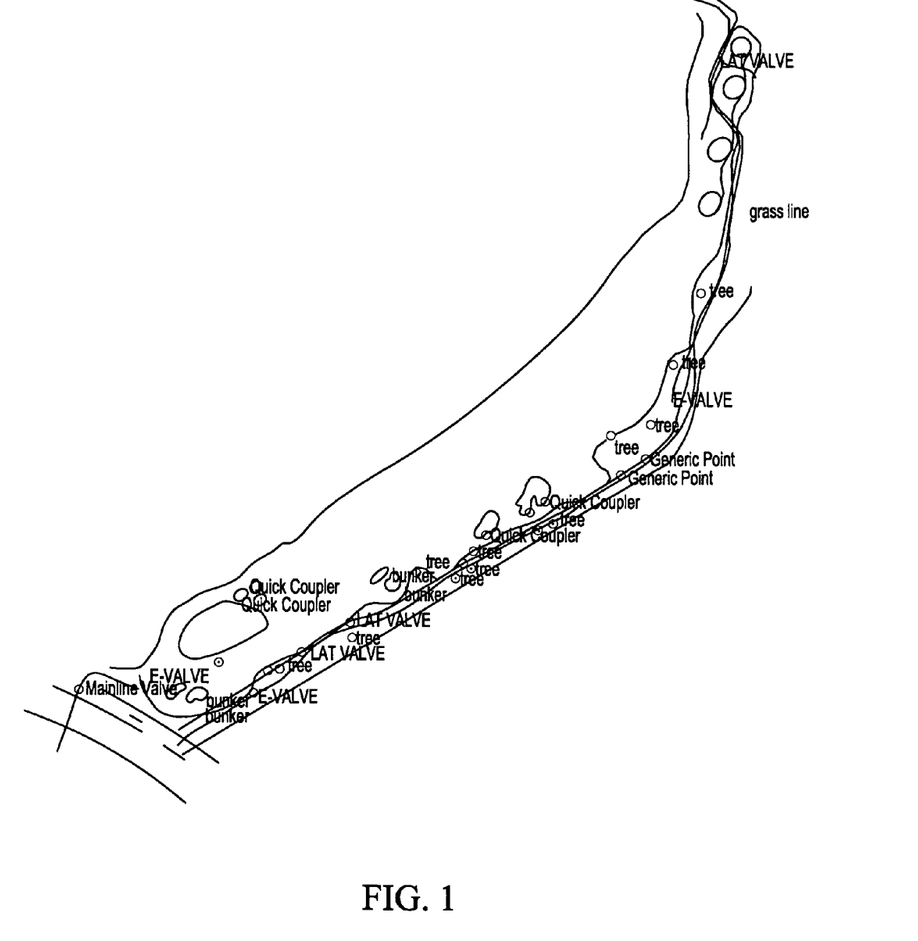
FIG. 1 is an overhead visual digital representation of a golf course hole prepared from data collected from GIS equipment in accordance with the present invention method and system.
Figure 2:
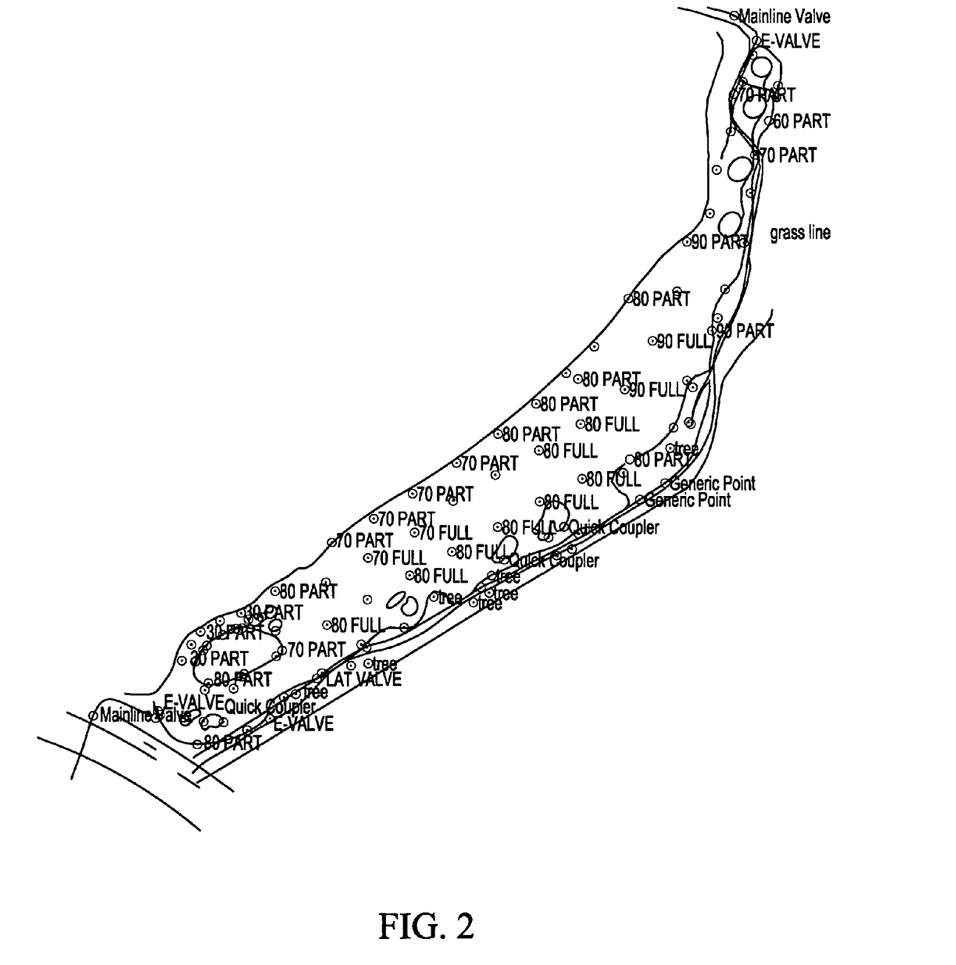
FIG. 2 is the overhead visual digital representation of FIG. 1 having various sprinkler locations and sprinkler types added on or applied to the digital representation which can be returned to the GIS or similar field equipment for on-site sprinkler locations.
Figure 5:
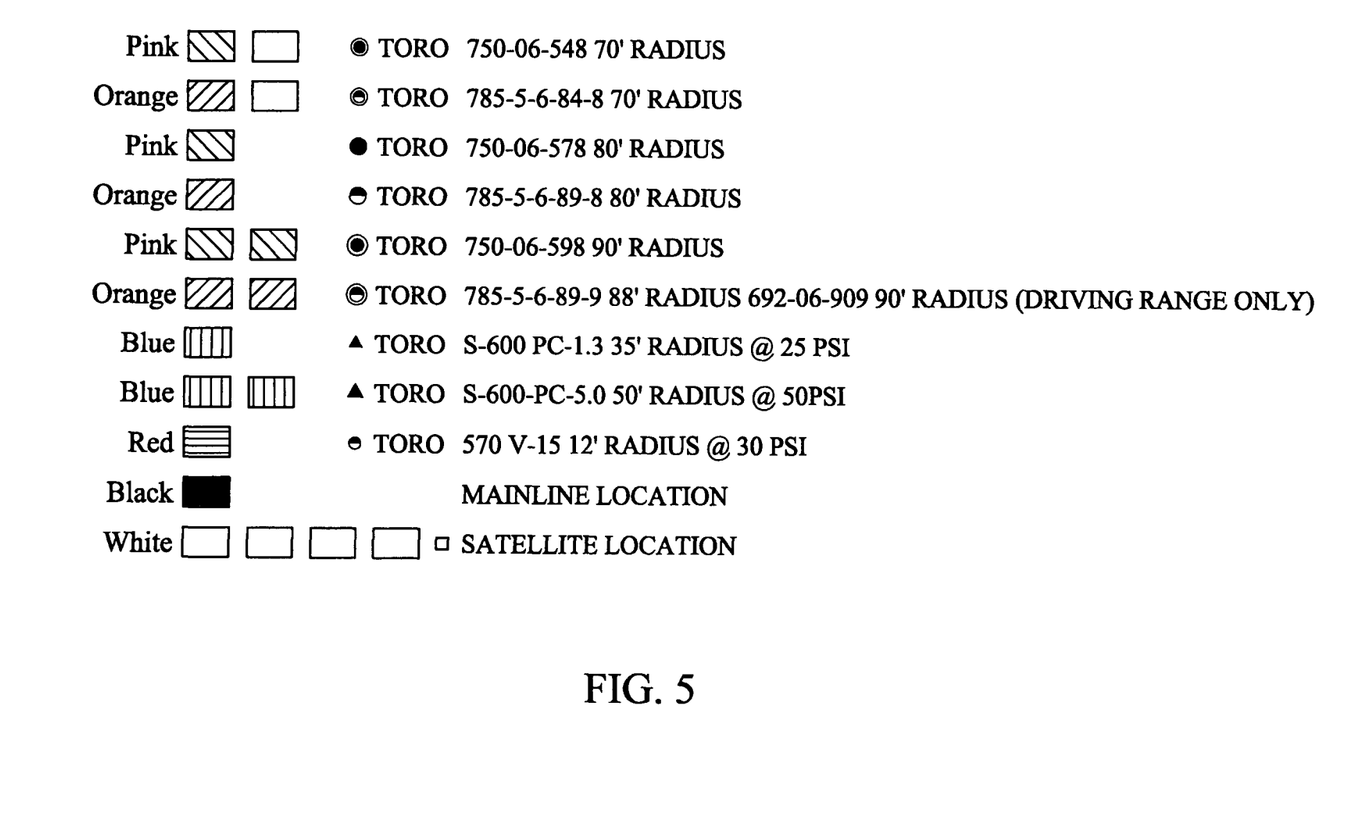
FIG. 5 is a flagging or staking legend providing a guide or chart of various sprinkler symbols which in one embodiment can appear on the digital representation of FIG. 2.

Using the visual overhead representation, the irrigation designer specifies or determines the irrigation sprinkler rotor locations for the golf course holes and marks such location by applying appropriate symbols on the digital representation (See FIG. 2). The sprinkler symbols, representing each sprinkler type nozzle specification (See FIG. 5) are applied to the drawing (overhead digital representation of FIG. 1) preferably using a drawing or input tool, such as, but not limited to an AutoCAD type drawing tool or compatible program, Eagle Point or Eaglepoint software program, programs for placing symbols onto a drawing or like program(s). Thus, the irrigation designer applies irrigation layout to the drawing file (e.g. AutoCAD compatible drawing file, etc.) and preferably all sprinkler location can be provided by symbols and attributes designating sprinkler type, radius, arc and/or nozzle.

Once completed, a digital file of the work area, with sprinkler locations shown, can be exported or otherwise saved in a "dxf" or similar applicable format as related to the GIS/GPS equipment being used. In one embodiment, once the sprinkler placement is complete, the drawing is converted to a GPS based data file. The converted drawing file can then be imported into a CAD compatible program and then the GPS based data, including sprinkler locations, can then be concerted to an AutoCAD or compatible type file format or other desired file format.

The original data file can then be forwarded back to the field technician, such as, but not limited to, by email to a portable computer or to an email address made available on site (at the golf course). In addition to the data file, a copy of each hole with sprinkler location is also prepared and sent back to the field technician. Preferably, the sprinkler location can be notated with different flag colors or other indicia for use or reference by the technician to mark the location on the golf course such that the irrigation contractor (individuals/company actually installing the sprinkler system) will note the type of sprinkler to install at the location (i.e. in terms of radius, arc, spray pattern, etc.).

Though color can be used, other non-color indicia can also be used and all are considered within the scope of the invention. Non-color symbols and/or indicia may become important where information is sent or received in a black and white format (i.e. facsimile, etc.) Thus, the drawing file can be preferably transferred back through the use of an internet, cable, DSL, satellite or cell communication to the irrigation design associate and/or may be retained on the drive of an onsite computer for sprinkler location application. Preferably, all data can be converted back to a GPS/GIS compatible format.

The technician preferably uploads the received field data and sprinkler coordinates back into the GIS data collection unit. Thus, the drawing data file(s) are transported/transmitted back to field technician for import back to GPS unit. Each sprinkler location can then be tracked using the GPS/GIS locator system as part of the GPS unit or separate unit. Either by foot or with onsite transportation (such as those previously described above for collecting the original data) the technician travels or mobilizes through each applicable golf hole inserting the appropriate colored flag or flags (or other flags, stakes, poles, tubes, marking devices, etc.) at each sprinkler location point as indicated on the drawing by the applicable coordinates provided by the GIS/GPS collection location unit. Thus, each sprinkler location can be marked by use of color coded pin flags that designate sprinkler information needed for field reference and installation by irrigation designer, contractor or other individual(s) or personnel.

The above steps are repeated as needed until the project is completed.

Figure 3:
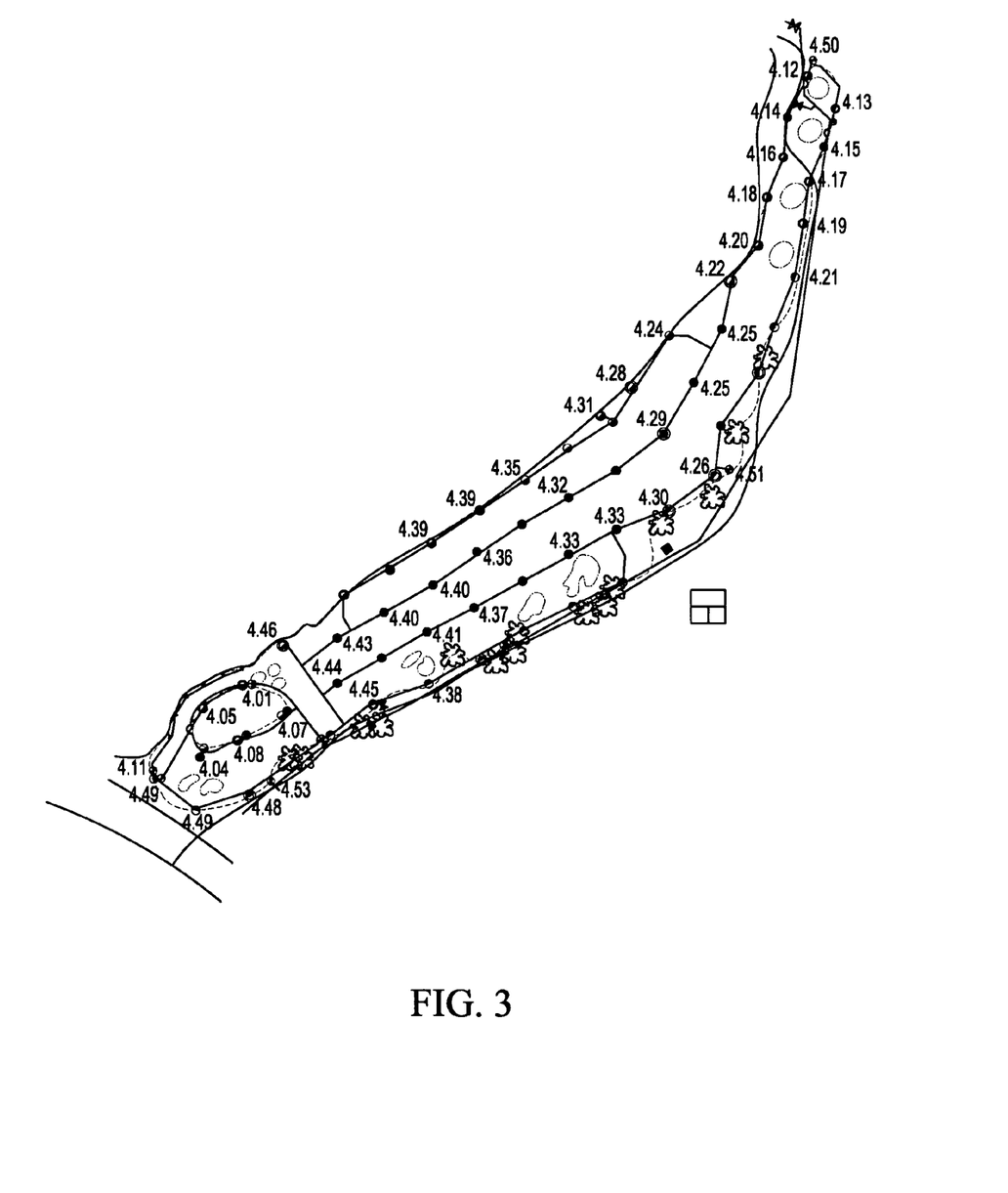
FIG. 3 is an overhead rough visual digital representation of the golf course hole of FIG. 1 showing the physical stake locations for the golf course hole which can be prepared from GIS or other field data.

As seen in FIG. 3, the technician can also create a map of all areas staked or flagged by the technician also through the use of his or her field equipment.

The present invention system and method allows for an improved comprehensive perspective of the hole being staked and better overall layout. Key personal, such, as but not limited to, the irrigation designer can apply their expertise in an efficient, pinpoint manner, without loss of valuable time in travel and other nonproductive time consuming tasks. Use of the GIS service can preferably be performed by staff with minimal training experience. Thus, the present invention allows the irrigation designer to perform many more projects due to the efficiency of the required interaction of key personnel and the diminished time associated with their applied expertise.

Though not preferred, it is also within the scope of the invention that the technician or other individual(s) prints out the digital representation of FIG. 1 and transmits the printout by facsimile, courier, mail, etc. to the remote location. The irrigation designer then marks the physical printout with sprinkler locations and can then scan the document and deliver it back to the technician. The designer can also deliver the marked up physical print out back to the technician also by facsimile, courier, mail, etc.

Though in the preferred embodiment, the irrigation designer is at a location remote to the golf course or other geographical location, it is also within the scope of the invention to merely provide the irrigation designer with a digital overhead representation of the golf course hole or other area at such location (golf course) and allow the designer using equipment available at the location (golf course) to designate the sprinkler locations. Thus, in this embodiment transmission back or forth of the digital layout representations may not be necessary and all steps may be performed with the field equipment.

The concepts of the present invention system and method is not limited to sprinkler locations and can be applied to identifying location on a geographical area for many types of items and objects and all are considered within the scope of the invention.

It should be recognized that the present invention system and method can also be used at the golf course, golf course hole, on site and/or geographical area and such use is also considered within the scope of the invention. For example, a computer having the necessary software for marking or plotting points on the drawing can be located on site or at the geographical area and the steps for marking the drawing can be performed on site. Though in this example, the marking individual (e.g. irrigation designer or marking individual/personnel is on-site, benefits are still provided as the individual is provided with an overhead perspective of the location and can provide more efficient sprinkler (or other item) designations for the geographical location. Furthermore, in this example, the same individual can first collect the GPS data and then go over to the computer (hardware/software) used for marking the drawing and perform the marking steps. In this version, the GPS collected data can be uploaded and sent to the computer at the location and the process of creating the drawing for marking, as well as the steps of marking the drawing with the various symbols, can be similar to that described when the computer is located at a location away from the geographical area for which data has been collected (e.g. golf course, etc.).

It is also within the scope of the invention, to provide a computer, laptop, PDA, hand-held device or other electronic device, which is capable of collecting the GPS data and also capable of containing the necessary software for creating the drawing based on the collected data and for marking the drawing with the appropriate symbols or other indicia.

Thus, for purposes of the specification and claims, the term "remote location" or "off site" is considered and defined to also include providing the necessary hardware and software on site (at the geographical area) and performing the steps for marking the drawing on site.

Additionally, though it is preferred that the present invention marking method be used for marking an overhead representation of the geographical area, such is not considered limiting. Therefore, the GPS data can also be used to create other figures or drawings, in addition to overhead representations, which in certain situations may also be useful or needed. Using non-overhead illustrations or layouts are also considered within the scope of the invention.

Furthermore, though GIS/GPS field data is preferably used with the present invention, the present invention is not considered limited to such use, and other field data formats may be used and are considered within the scope of the invention.

Lastly, it should be recognized that the individual collecting the GPS data at the geographical area and the individual marking the drawing are not required to be from the same company or have any previous business or personal relationship.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modifications disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A method for marking locations where to install one or more sprinklers for a golf course hole from a location remote to the golf course where the golf course hole is located, said method comprising the steps of:
    (a) collecting data with an electronic device pertaining to an overhead layout for a golf course hole, representing at least a golf course hole putting green area, driving area and fairway area;

(b) electronically transmitting the collected data in a digital format to a location remote from a location of a golf course where the golf course hole is located; and (c) electronically receiving digital data from the remote location pertaining to the golf course hole, said received digital data containing information regarding locations where to install one or more sprinklers for the golf course hole which was not contained in the data collected in step (a) and which said sprinkler install locations are determined at the remote location and added at the remote location as part of the data transmitted back in step (b).

2. The method of in claim 1 further comprising the step of (d) physically marking each sprinkler installation location with an object based on the digital data received in step (c) prior to installing a sprinkler at the location.

3. The method of claim 2 wherein step (d) comprises the step of inserting a flag or stake into the ground at the general location for each sprinkler installation location identified in the received digital data.

4. The method from claim 1 wherein in step (c) also includes the step of receiving from the remote location digital data pertaining to a type of sprinkler to install at the marked sprinkler installation location.

5. The method of claim 2 further comprising the step of a digital representation of the golf course hole identifying each location on the golf course hole that has been marked with a location to where to install a sprinkler.

6. A method for marking locations where to install one or more sprinklers for a golf course hole from a location remote to the golf course where the golf course hole is located, said method comprising the steps of:

(a) electronically receiving digital data from an electronic device at a location remote to the golf course, said digital data pertaining to a general layout for golf course hole representing at least a golf course hole putting green area, driving area and fairway area;

(b) electronically marking on a displayed overhead layout of the golf course hole at the remote location locations where to install one or more sprinklers for the golf course hole, the displayed overhead layout based on the received digital data, and (c) electronically transmitting to another location digital data representing the golf course hole layout and the one or more marked sprinkler installation locations;

wherein said electronically marking is determined at a location remote to the golf course.

7. The method of claim 6, further comprising the step of identifying the type of sprinkler to install at each marked sprinkler installation location and transmitting such information to the another location in addition to the data transmitted in step (c).

8. A method for marking locations where to install one or more sprinklers for a golf course hole from a location remote to the golf course where the golf course hole is located, said method comprising the steps of:

(a) electronically collecting data by a electronic device pertaining an overhead layout for a golf course hole, representing at least a golf course hole putting green area, driving area and fairway area;

(b) electronically transmitting the collected data in digital information to a location remote from a golf course where the golf course hole is located;

(c) electronically receiving the collected data at the location remote from the golf course where the golf course hole is located;

(d) displaying an overhead layout of the golf course hole on an electronic display at the remote location, said overhead layout based on the received collected data;

(e) electronically marking locations for where to install one or more sprinklers for the golf course hole on the displayed overhead layout, (f) electronically transmitting to an electronic device at another location digital data representing the golf course hole layout and the one or more locations where to install the one or more sprinklers for the golf course hole; and (g) receiving the digital data by an electronic device from at another location transmitted from the remote location; wherein the data electronically collected in step (a) does not include any installation locations regarding where to install the one or more sprinklers and the sprinkler installation locations are determined at the remote location and added at the remote location as part of the data transmitted back in step (f).

9. The method of claim 8, further comprising the step of identifying the type of sprinklers to install at each marked sprinkler installation location and transmitting such information to the another location in addition to the data transmitted in step (f).

10. The method of claim 8 further comprising the step of physically marking each sprinkler installation location on the golf course hole based on the digital data received from the remote location and prior to installing a sprinkler at the location.

11. The method of claim 10 wherein the step of physically marking comprises the step of inserting a flag or stake into the ground at the general location for each sprinkler installation location identified in the received digital data.

12. The method of claim 10 further comprising the step of a digital representation of the golf course hole identifying each location on the golf course hole that has been marked with a location to where to install a sprinkler.

13. A method for marking locations where to install one or more sprinklers for a golf course hole from a location remote to the golf course where the golf course hole is located, said method comprising the steps of:

(a) electronically collecting feature data for a golf course hole with a GIS/GPS electronic device pertaining to an overhead representation of the golf course hole:

(b) uploading the collected feature data to a computer or similar device at or near to the golf course hole to create an uploaded data file;

(c) electronically transmitting the uploaded data file to a location remote to a golf course where the golf course hole is located;

(d) electronically receiving the uploaded data file at the remote location;

(e) importing the data from the received uploaded data file into a software program stored on a computer at the remote location;

(f) displaying a digital overhead representation of the golf course hole on an electronic display at the remote location;

(g) electronically marking on the digital overhead representation locations for where to install one or more sprinklers for the golf course hole;

(h) creating one or more digital files containing data representing the digital overhead representation and the one or more sprinkler installation locations;

(i) electronically forwarding the created one or more digital files from the remote location to a location on site at the golf course having the golf course hole;

(j) uploading at the on site location the received one or more digital files into a GIS/GPS electronic device regarding where to install the one or more sprinklers for the golf course hole; and (k) tracking each sprinkler installation location for the golf course hole with the GIS/GPS electronic device based on the uploaded one or more digital files;

wherein the data electronically collected in step (a) does not include any installation locations regarding where to install the one or more sprinklers and the sprinkler installation locations are determined at the remote location and added at the remote location as part of the data transmitted back in step (i).

14. The method of claim 13 wherein step (a) comprises the step of obtaining GPS location points and linear data for specific features of the golf course hole.

15. The method of claim 13 wherein step (a) is performed by an individual at the golf course hole.

16. The method of claim 13 wherein the uploaded data file is transmitted as an email attachment or email link.

17. The method of claim 13 wherein the step of marking comprises providing a specific symbol on the digital overhead representation for each sprinkler location, wherein the specific symbol represents one or more of the following sprinkler type, radius type, arc type and nozzle type for the sprinkler to be installed at the sprinkler installation location.

18. The method of claim 17 wherein the specific symbol is one or more flags of one or more certain colors.

19. The method of claim 13 further comprising the step of physically marking the golf course hole during tracking step (k) at each sprinkler installation location for the golf course hole and prior to installing a sprinkler at each installation location.

20. The method of claim 19 wherein the step of physically marking comprises the step of inserting a flag or stake into the ground at the general installation location for each sprinkler identified in the one or more uploaded digital data.

21. The method of claim 19 further comprising the step of a digital representation of the golf course hole identifying each location on the golf course hole that has been marked with a location to where to install a sprinkler.

22. An electronic method for marking locations for one or more items at a geographical area from a location remote to the geographical area, said method comprising the steps of:

(a) electronically collecting data pertaining to an overhead layout for the geographical area;

(b) electronically transmitting the collected data in a digital format to a location remote from the geographical area;

(c) receiving the collected data at the remote location;

(d) displaying an overhead layout of the geographical area on an electronic display at the remote location, said overhead layout based on the received collected data;

(e) electronically marking one or more locations for where to install, position or construct one or more items at the geographical area on the displayed overhead layout, (f) transmitting to another location digital data representing the geographical area layout and the locations for installing, positioning or constructing one or more items at the geographical area; and (g) receiving the digital data at the another location transmitted from the remote location;

wherein the data electronically collected in step (a) does not include any locations regarding where to install, position or construct the one or more items and the item installation, positioning or constructing locations are determined at the remote location and added at the remote location as pan of the data transmitted back in step (f).

* * * * *